United States Patent [19]
Nagasawa

[11] 4,150,652
[45] Apr. 24, 1979

[54] CONTACTLESS IGNITION SYSTEM FOR INTERNAL COMBUSTION ENGINE

[75] Inventor: Masao Nagasawa, Kariya, Japan

[73] Assignee: Nippondenso Co., Ltd., Kariya, Japan

[21] Appl. No.: 637,185

[22] Filed: Dec. 3, 1975

[30] Foreign Application Priority Data

| Dec. 9, 1974 [JP] | Japan | 49-141928 |
|---|---|---|
| Jan. 27, 1975 [JP] | Japan | 50-12183 |
| Mar. 5, 1975 [JP] | Japan | 50-27492 |
| Jan. 27, 1975 [JP] | Japan | 50-12183 |

[51] Int. Cl.$^2$ .............................. F02P 1/00
[52] U.S. Cl. ............................. 123/148 CC
[58] Field of Search .................. 123/148 E, 148 CC

[56] References Cited

U.S. PATENT DOCUMENTS

| 3,464,397 | 9/1969 | Burson | 123/148 CC |
| 3,500,809 | 3/1970 | Hohne et al. | 123/148 CC |
| 3,524,438 | 8/1970 | Janisch | 123/148 CC |
| 3,809,043 | 5/1974 | Nagasawa | 123/148 CC |
| 3,864,621 | 2/1975 | Haubner et al. | 123/148 E |
| 3,866,589 | 2/1975 | Haubner et al. | 123/148 E |
| 3,898,972 | 8/1975 | Haubner | 123/117 R |
| 3,933,139 | 1/1976 | Beeghly | 123/148 E |

Primary Examiner—Charles T. Jordan
Attorney, Agent, or Firm—Cushman, Darby & Cushman

[57] ABSTRACT

A contactless ignition system for an internal combustion engine wherein a capacitor is charged by the output from the generating coils of a magneto-alternator driven by the engine, the output of the generating coils is applied to the gate of a thyristor through a transformer to turn on the thyristor, the stored charge on the capacitor is rapidly discharged through the primary winding of an ignition coil in response to the conduction of the thyristor to generate a high voltage in the secondary winding of the ignition coil and cause an ignition spark at the desired spark plug, and the output of the generating coils is applied to the gate of the thyristor through a second transformer and a Zener diode so that when the number of revolutions of the engine exceeds a predetermined value the output of the second transformer becomes higher than the Zener voltage of the Zener diode and the gate voltage of the thyristor is varied in accordance with the output of the second transformer to retard or advance the firing timing of the thyristor and thereby to obtain the desired ignition timing characteristic.

20 Claims, 22 Drawing Figures

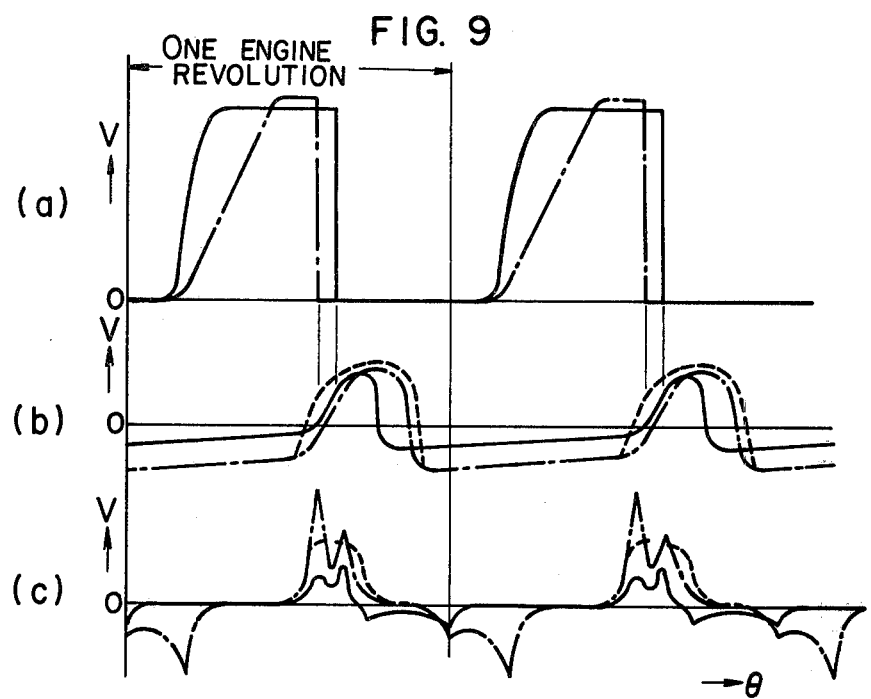
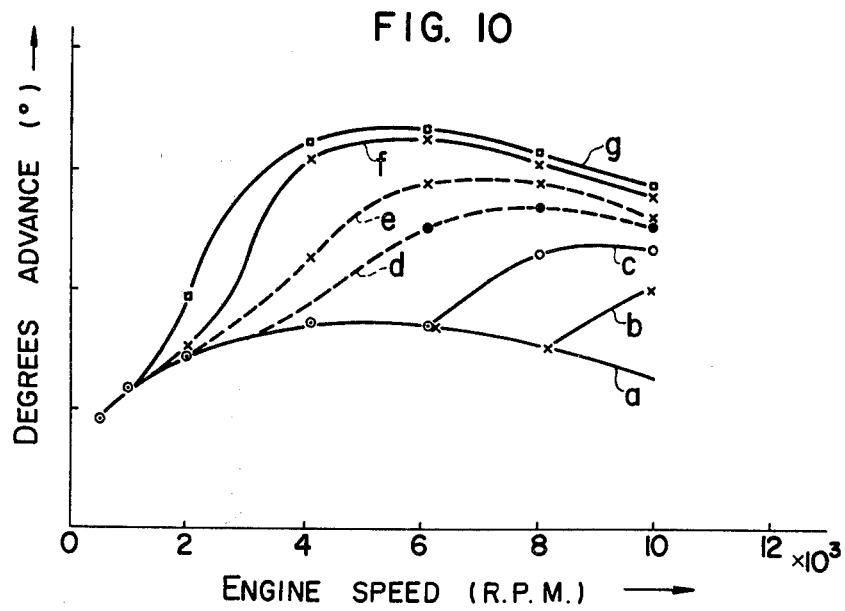

CONTACTLESS IGNITION SYSTEM FOR INTERNAL COMBUSTION ENGINE

The present invention relates to a contactless ignition system for an internal combustion engine wherein the same generating coils of a magneto-alternator are used in an ignition power source as well as an ignition signal power source and the output of the generating coils is converted through two signal conversion circuits having different impedances to provide an ignition signal.

The conventional capacitor charge and discharge type contactless ignition systems employing a magneto generator as a capacitor charging power source as well as an ignition signal power source are designed so that the positive going output of a capacitor charging coil disposed in the magneto generator is used to charge a capacitor and at least part of the subsequently generated negative going output is applied through a signal conversion circuit to the gate of a thyristor for controlling the stored charge on the capacitor so that the thyristor is turned on and the stored charge on the capacitor is rapidly discharged through the ignition coil in a discharging circuit to provide the desired ignition spark. A disadvantage of this type of ignition system is that the range of spark advance patterns that can be designed is limited by the waveforms of generated output.

Recently, particularly with the two-cycle internal combustion engines of the type which are run at high speeds for racing purposes or the like, there has been a demand for an ignition system which is capable of comparatively rapidly retarding the spark at speeds near the maximum usable number of revolutions to improve the engine efficiency. On the other hand, with the four-cycle internal combustion engines there has been a demand for an ignition system which is capable of rapidly advancing the ignition timing at speeds near the idling speed. There also has existed a need for an ignition system which is designed for other purposes, namely, one which is designed so that at speeds near the maximum usable number of revolutions the ignition timing is rapidly changed to one which reduces the power output of the engine so as to prevent danger due to an abnormally high speed operation of the engine. However, if the ignition timing is rapidly retarded as mentioned earlier, when the engine is not under load, such as, when the vehicle jumps over a gap while running on the road, there is the danger of the engine speed becoming excessively high thus retarding the ignition timing excessively and causing the engine to fail to operate satisfactorily. Also the ignition system of the characteristic which advances the ignition timing of four-cycle engines is disadvantageous in that there is the danger of the engine being operated at abnormally high speeds.

Ignitions systems of the type capable of providing the desired complicated spark advancing characteristics are shown, for example, in the Japanese Patent Application Publication No. 48-44698 and Japanese Laid Open Patent Application Publication No. 48-45721 wherein the capacitor charge controlling thysitor is controlled according to the combined output of the two signal coils of an alternator having different numbers of turns and adapted for generating outputs which are in phase or out of phase with each other. A disadvantage of this type of ignition system is that it is possible to provide only specified positive spark advances (negative spark advances cannot be provided) and moreover the ignition timing is controlled in accordance with the generated outputs of the signal coils per se thus making the setting of the spark advances difficult and requiring the use of different signal coils.

It is therefore an object of the present invention to provide a contactless ignition system for an internal combustion engine wherein any desired spark advance characteristic can be easily obtained.

It is another object of the invention to provide a contactless ignition system for an internal combustion engine which is simple in construction and in which both an ignition power source and an ignition signal power source can be provided by the same generating coils of a magneto-alternator.

It is still another object of the invention to provide a contactless ignition system for an internal combustion engine which is capable of providing not only positive spark advance characteristics but also negative spark advance characteristics, whereby at high speed operation of a two-cycle racing internal combustion engine the ignition timing is rapidly retarded to improve the efficiency of the engine and prevent the overspeeding of the engine as well.

These and other objects of the invention will be apparent from reference to the description, taken in connection with the accompanying drawings.

FIG. 9 is a waveform diagram useful for explaining the operation of the system shown in FIG. 8.

FIG. 10 is an ignition timing characteristic diagram of the system shown in FIG. 8.

The present invention will now be described in greater detail with reference to the illustrated embodiments.

Figure 1:
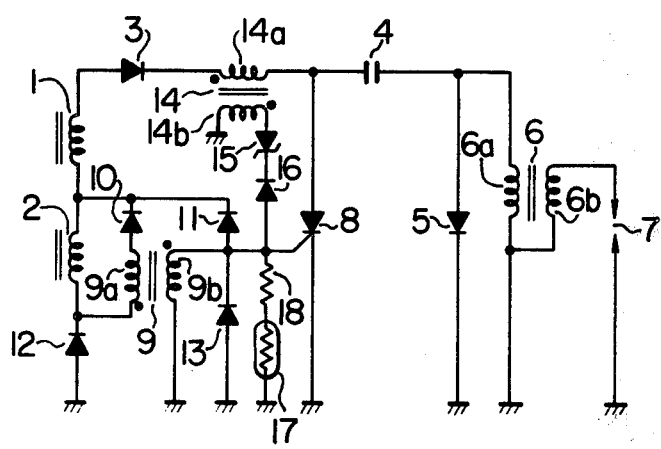
FIG. 1 is a circuit diagram showing a first embodiment of a contactless ignition system according to the present invention.

Referring first to FIG. 1 showing a first embodiment of the invention, numerals 1 and 2 designate the known capacitor charging coils of a permanent magnet type alternator (hereinafter referred to as a magneto generator), namely, numeral 1 designates a high-speed capacitor charging coil having a small number of winding turns for generating a large output at high engine speeds and numeral 2 designates a low-speed capacitor charging coil having a large number of winding turns for generating a large output at low engine speeds and the capacitor charging coils 1 and 2 are connected in series with each other. Numeral 3 designates a diode connected in series with the capacitor charging coils 1 and 2, 4 a capacitor, 5 a diode connected in series with the capacitor 4. Numeral 6 designates an ignition coil comprising a primary winding 6a connected in parallel with the diode 5 and a secondary winding 6b connected to a spark plug 7 mounted in the cylinder head of the engine, 8 a thyristor or a semiconductor switching element having its anode connected to the capacitor 4, 9 a transformer comprising a primary winding 9a connected in parallel with the low-speed capacitor charging coil 2 through a diode 10 and a secondary winding 9b connected between the gate and cathode of the thyristor 8. Numeral 12 designates a diode connected between the low-speed capacitor charging coil 2 and the ground, 11 and 13 diodes connected between the high-speed capacitor charging coil 1 and the ground. A juncture between diodes 11 and 13 is connected to one side of the secondary winding 9b as well as the gate of the thyristor 8. Numeral 14 designates a transformer comprising a primary winding 14a connected between the diode 3 and the capacitor 4 and a secondary winding 14b connected between the gate and cathode of the thyristor 8, 15 and 16 a Zener diode and a diode connected in series between the secondary winding 14b of the transformer 14 and the gate of the thyristor 8, 17 and 18 a temperature compensating thermistor and a resistor connected in series between the gate and cathode of the thyristor 8. In the Figure, the dots on the transformers 9 and 14 indicate their positive polarity sides.

Figure 2:
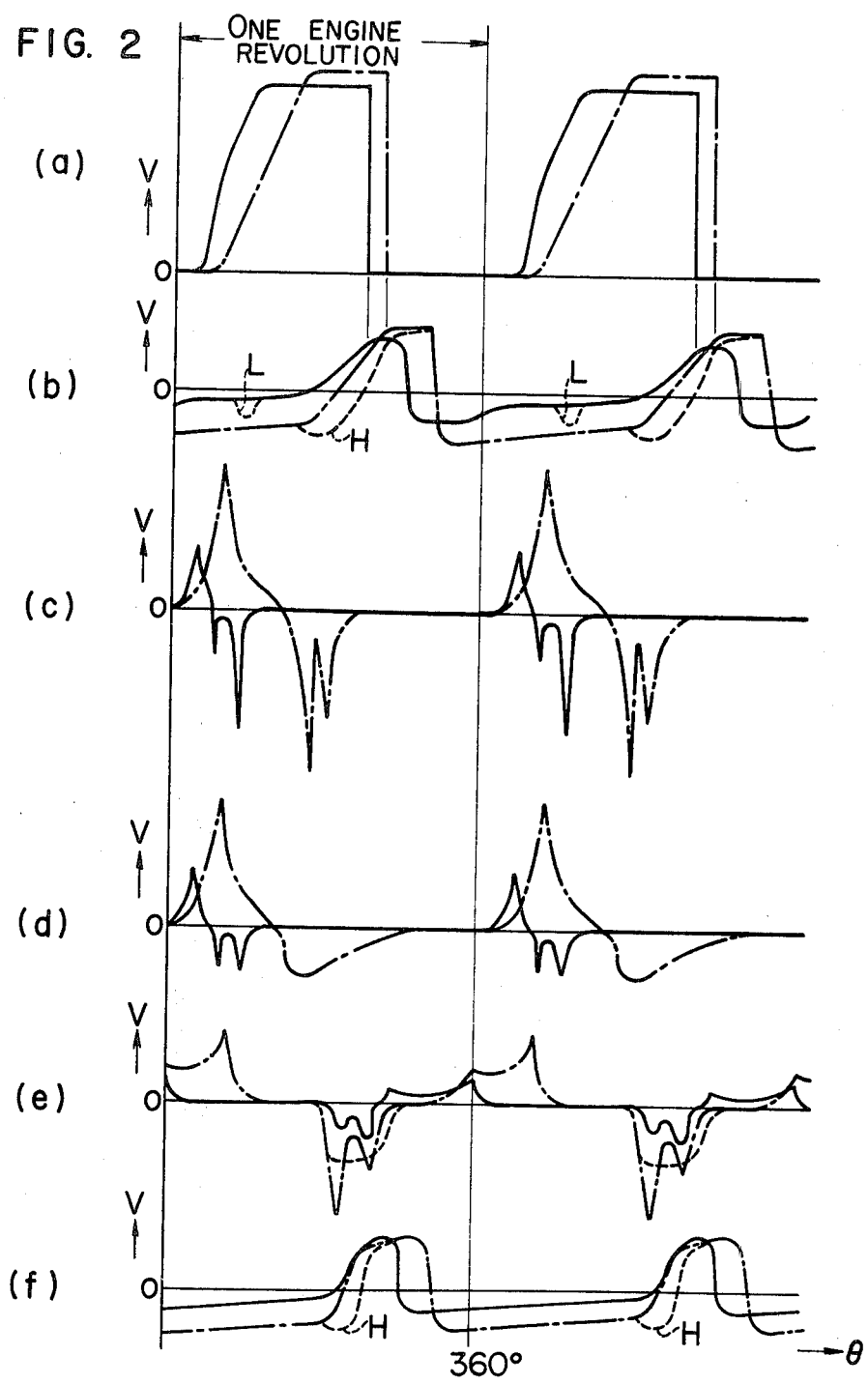
FIG. 2 is a waveform diagram useful for explaining the operation of the system shown in FIG. 1.
Figure 3:
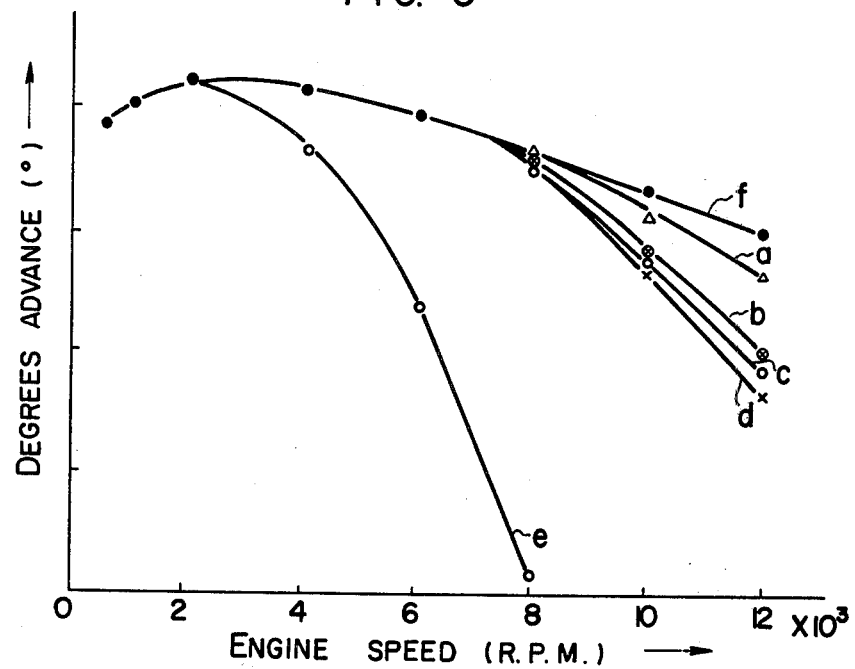
FIG. 3 is an ignition timing characteristic diagram of the system shown in FIG. 1.

With the construction described above, the operation of the first embodiment will now be described. In this embodiment, the permanent magnet type alternator (magneto generator) is of the two-pole type which generates one cycle of the AC output for every revolution of the AC voltage is, therefore, generated in not only the high-speed capacitor charging coil 1 having a relatively small number of winding turns and adapted for chiefly charging the capacitor 4 at high engine speeds but also the low-speed capacitor charging coil 2 having a relatively large number of winding turns and adapted for chiefly charging the capacitor 4 at low engine speeds. Consequently, at low engine speeds, when a positive going voltage begins to develop in the capacitor charging coils 1 and 2, the capacitor 4 is charged as shown by a solid line in (a) of FIG. 2 by current flowing from the capacitor charging coils 1 and 2 through a circuit comprising the low-speed capacitor charging coil 2, the high-speed capacitor charging coil 1, the diode 3, the primary winding 14a of the transformer 14, the capacitor 4, a parallel circuit of the diode 5 and the primary winding 6a, the ground and the diode 12 in this order. In FIG. 2, the abscissa represents the rotational angle θ of the magneto generator (i.e. the engine). Suppose that the voltage across the secondary winding 14b is measured under no-load conditions, the voltage shown by a solid line in (c) of FIG. 2 appears thereacross. When the negative going voltage of the above no-load voltage exceeds a predetermined value at which the Zener diode 15 becomes conductive, the voltage shown by a solid line in (d) of FIG. 2 appears across the secondary winding 14b and thereby the voltage shown by the broken line L in (b) of FIG. 2 appears between the gate and cathode of the thyristor 8. However, this voltage has no influence on conduction of the thyristor 8 due to a reverse bias voltage in the negative direction. When the generated voltage in the capacitor charging coils 1 and 2 reverses its direction from the positive to the negative, the generated voltage in the low-speed capacitor charging coil 2 is short-circuited through the primary winding 9a of the transformer 9 and the diode 10 and the output of the secondary winding 9b of the transformer 9 causes the voltage between the gate and cathode of the thyristor 8 to become as shown by a solid line in (b) of FIG. 2. When the gate voltage of the thyristor 8 attains the trigger level of the thyristor 8, the thyristor 8 is turned on and the stored charge on the capacitor 4 is discharged through a circuit comprising the capacitor 4, the thyristor 8, the ground and the primary winding 6a of the ignition coil 6, resulting in a generation of a high voltage in the secondary winding 6b of the ignition coil 6, to thereby cause an ignition spark at the spark plug 7. The diode 5 serves to keep the current flow in the primary winding 6a of the ignition coil 6 to elongate the arc duration of the ignition spark at the spark plug 7. At high engine speed operation, the capacitor 4 is charged as shown by a dot-and-dash line in (a) of FIG. 2 chiefly by a current flowing from the high-speed capacitor charging coil 1 through a circuit comprising the high-speed capacitor charging coil 1, the diode 3, the primary winding 14a of the transformer 14, the capacitor 4, a parallel circuit of the diode 5 and the primary winding 6a of the ignition coil 6, the ground, the diode 13 and the diode 11. During this charging period, the output generated in the secondary winding 14b of the transformer 14 under no-load conditions becomes as shown by a dot-and-dash line in (c) of FIG. 2, whereas the output generated under load conditions becomes as shown by a dot-and-dash line in (d) of FIG. 2. When the output of the capacitor charging coils 1 and 2 reverses, the secondary winding 9b generates the output voltage as shown by a dot-and-dash line in (b) of FIG. 2 when measured under no-load conditions. However, a part of the negative half wave of the output voltage at the secondary winding 14 shown by the dot-and-dash line in (d) of FIG. 2 overlaps a part of the output voltage at the secondary winding 9b, whereby the output voltage shown by a broken line H in (b) of FIG. 2 is finally supplied to the gate of the thyristor 8, thus retarding the ignition timing. In this case, depending on the Zener voltage value (breakdown voltage) of the Zener diode 15 and the number of diode(s) 16 used, the ignition timing at high engine speeds may be varied as shown by the curves a through e in FIG. 3. For instance, in FIG. 3 the curve a indicates the ignition timing characteristic obtained when the Zener voltage of the Zener diode 15 is 12 volts and the single diode 16 is used, while the curves b, c, d and e are respectively the ignition timing characteristics when the Zener voltage of the Zener diode 15 is 6 volts and using three units, two units and single unit of the diode 16, respectively, and the ignition timing characteristic obtained when the Zener diode 15 is eliminated and the single diode 16 is used. Further, the curve f indicates the ignition timing characteristic obtained when the secondary winding 14b of the transformer 14 is open-circuited.

Figure 4:
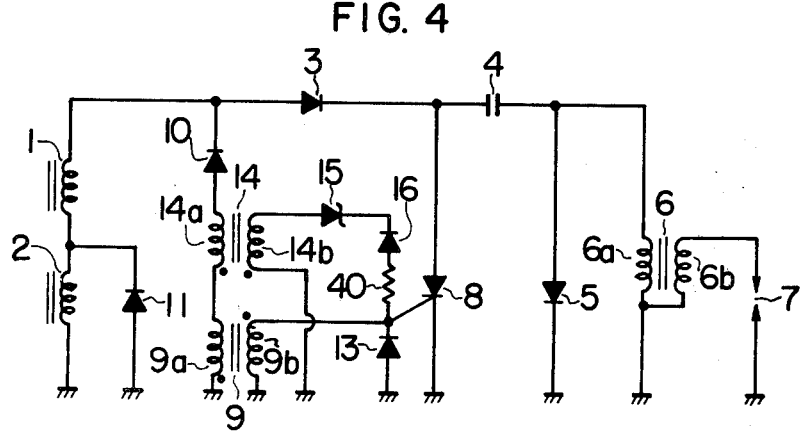
FIG. 4 is a circuit diagram showing a second embodiment of the system of the invention.
Figure 5:
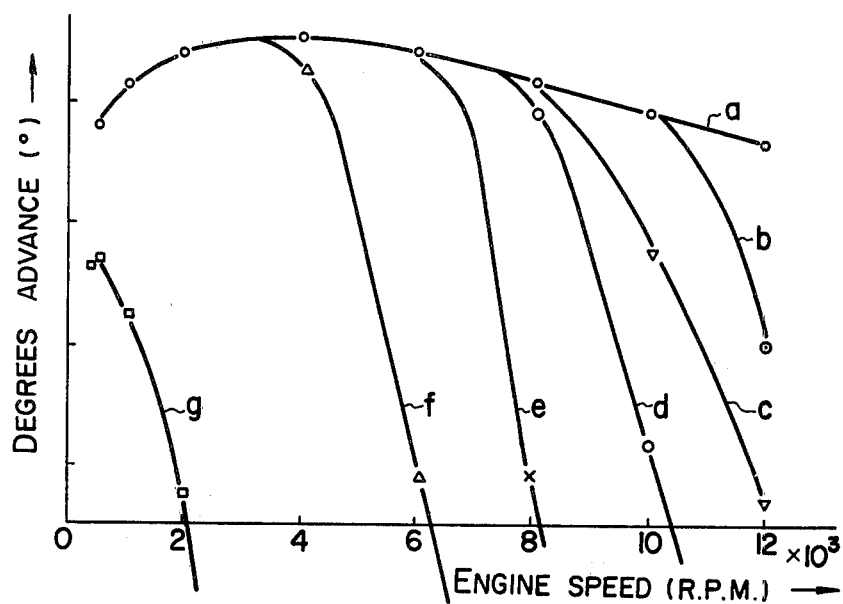
FIGS. 5 and 6 are ignition timing characteristic diagrams of the system shown in FIG. 4.
Figure 6:
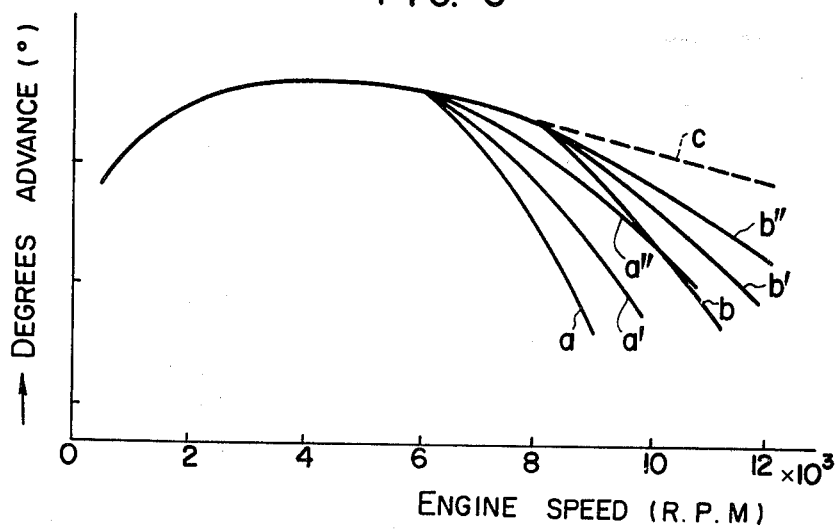

Referring to FIG. 4, there is illustrated a second embodiment of the invention which differs from the first embodiment of FIG. 1 in that the priminary winding 9a of the transformer 9 is connected in series with the primary winding 14a of the transformer 14 which controls the ignition timing at high engine speeds, the resulting series circuit is connected in parallel with the capacitor charging coils 1 and 2 and a resistor 40 is connected between the secondary winding 14b of the transformer 14 and the gate of the thyristor 8. In this second embodiment, the output of the high-speed capacitor charging coil 1 having a relatively small number of winding turns is mainly applied to the transformers 9 and 14 so that the degree of spark advance at low engine speeds can be increased and the degree of spark retard at intermediary engine speeds can be decreased than in the case of the first embodiment. Further, since, as shown in (e) of FIG. 2, the secondary output of the transformer 14 in the second embodiment lags in phase behind the secondary output of the transformer 14 of the first embodiment shown in (d) of FIG. 2 so that the relatively early rising portion of the waveform is used to produce an ignition signal as shown in (f) of FIG. 2 and the resulting ignition timing characteristic shows that if the Zener voltage is decreased by the Zener voltage of the Zener diode 15, it is possible to cause the spark retard to commence at lower engine revolutions as shown in FIGS. 5 and 6. Namely, in FIG. 5 showing the ignition timing characteristics obtained without the resistor 40 of the embodiment shown in FIG. 4, the curve a indicates the ignition timing characteristic obtained when the secondary winding 14b of the transformer 14 is open-circuited, the curves b, c, d, e and f indicate the ignition timing characteristics obtained when the Zener voltage of the Zener diode 15 is selected 30, 24, 18, 12 and 6 volts, respectively, and the curve g indicates the ignition timing characteristic obtained when the Zener diode 15 is eliminated and the diode 16 alone is connected to the secondary winding 14b of the transformer 14. In FIG. 6, the curves a and b are the ignition timing characteristics when the Zener voltage of the Zener diode 15 is selected 12 and 18 volts, respectively, and the resistor 40 is not used, the curves a' and a'' are the ignition timing characteristics when the Zener voltage of the Zener diode 15 is 12 volts and the resistance value of the resistor 40 is selected 180 and 470 ohms, respectively, and the curves b' and b'' are the ignition timing characteristics when the Zener voltage of the Zener diode 15 is selected 18 volts and the resistance value of the resistor 40 is selected 180 and 470 ohms, respectively. The broken line curve c in FIG. 6 is the ignition timing characteristic when the secondary winding 14b of the transformer 14 is open-circuited. On the other hand, in (e) of FIG. 2 the solid line is the no-load output voltage generated in the secondary winding 14b of the transformer 14 at low engine speeds, the dot-and-dash line is the no-load output voltage generated in the secondary winding 14b of the transformer 14 at high engine speeds, and the broken line is the output voltage of one direction generated in the secondary winding 14b of the transformer 14 at load, high engine speed operation with its waveform having the same shape as the no-load output voltage shown by the dot-and-dash line since the output voltage of the other direction at load is blocked by the diode 16. In (f) of FIG. 2, the solid line is the voltage applied between the gate and cathode of the thrystor 8 at low engine speeds, the dot-and-dash line is the voltage applied between the gate and cathode of the thyristor 8 at high engine speeds with the secondary winding 14b of the transformer 14 being open-circuited, and the broken line H is the voltage applied between the gate and cathode of the thyristor 8 at high engine speeds with the secondary winding 14b of the transformer 14 being connected as shown in FIG. 4 and in addition to that shown by the broken line H the voltage of the same waveform as the voltage indicated by the dot-and-dash line and generated with the secondary winding 14b of the transformer 14 being open-circuited is applied between the gate and cathode of the thyristor 8.

Figure 7:
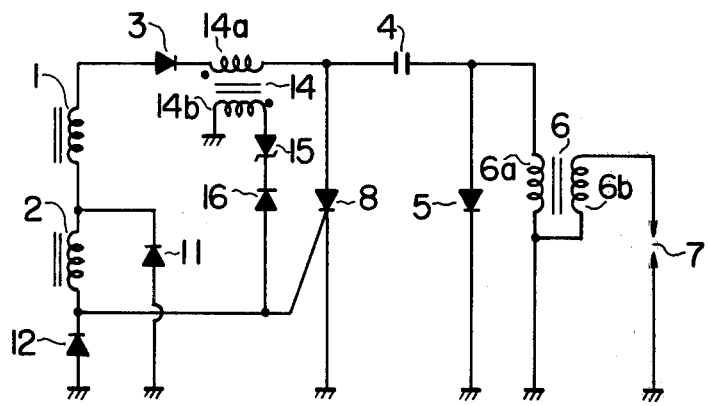
FIGS. 7 and 8 are circuit diagrams showing respectively third and fourth embodiments of the system of this invention.

Referring now to FIG. 7, there is shown a third embodiment of the invention which differs from the first embodiment of FIG. 1 in that instead of using the ignition transformer 9, the gate of the thyristor 8 is directly connected to the cathode of the diode 12 and the non-charging direction output from the low-speed capacitor charging coil 2 is directly applied across the gate and cathode of the thyristor 8 through the diode 11. The third embodiment operates practically in the same manner as the first embodiment.

Figure 8:
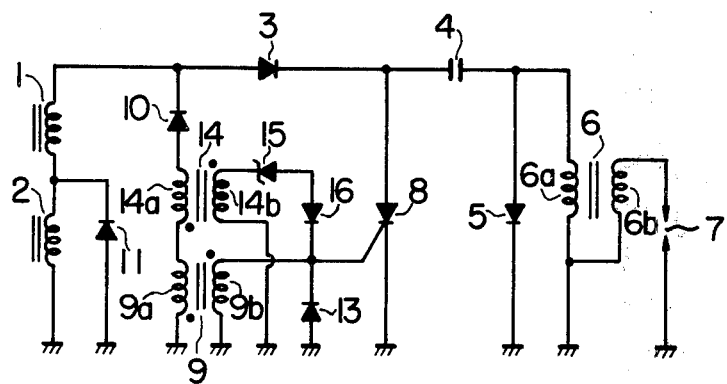

FIG. 8 is a fourth embodiment of the invention which differs from the second embodiment of FIG. 4 in that the polarities of the secondary winding 14b of the transformer 14, the Zener diode 15 and the diode 16 are reversed and the resistor 40 is eliminated. The operation of the fourth embodiment is as follows. One cycle of the AC voltage is generated for every revolution of the engine in the high-speed capacitor charging coil 1 having a relatively small number of winding turns and adapted for charging the capacitor 4 chiefly at high engine speeds and the low-speed capacitor charging coil 2 having a relatively large number of winding turns and adapted for charging the capacitor 4 chiefly at low engine speeds. With the engine operating at a low speed, when a positive going voltage begins to develop in the capacitor charging coils 1 and 2, the capacitor 4 is charged as shown by the solid line in (a) of FIG. 9 by current flowing from the capacitor charging coils 1 and 2 through a circuit comprising the low-speed capacitor charging coil 2, the high-speed capacitor charging coil 1, the diode 3, the capacitor 4, a parallel circuit of the diode 5 and the primary winding 6a of the ignition coil 6 and the ground. When the generated voltage in the capacitor charging coils 1 and 2 reverses its direction from the positive to the negative, the output of the low-speed capacitor charging coil 2 is short-circuited through the diode 11, however the output of the high-speed capacitor charging coil 1 is short-circuited through a circuit comprising the high-speed capacitor charging coil 1, the low-speed capacitor charging coil 2, the ground, the primary winding 9a of the transformer 9, the primary winding 14a of the transformer 14 and the diode 10. Consequently, the output shown by the solid line in (b) of FIG. 9 is generated in the secondary winding 9b of the transformer 9 and it is then applied across the gate and cathode of the thyristor 8. When this occurs, the thyristor 8 is turned on and the stored charge on the capacitor 4 is discharged through a circuit comprising the capacitor 4, the thyristor 8, the ground and the primary winding 6a of the ignition coil 6 thus generating a high voltage in the secondary winding 6b of the ignition coil 6 and causing an ignition spark at the spark plug 7. On the other hand, although the output shown by the solid line in (c) of FIG. 9 is generated in the secondary winding 14b of the transformer 14 simultaneously with the generation of the output in the secondary winding 9b of the transformer 9, the magnitude of this output is small when the engine is operating at a low speed and consequently the Zener diode 15 is not rendered conductive with the result that no current flows through a circuit comprising the secondary winding 14b of the transformer 14, the Zener diode 15, the diode 16, and the gate and cathode of the thyristor 8, and thereby the thyristor 8 is not affected by the output at the secondary winding 14b in any way. The charging of the capacitor 4 at high engine speeds is accomplished by current flowing from the high-speed capacitor charging coil 1 through a circuit comprising the high-speed capacitor charging coil 1, the diode 3, the capacitor 4, a parallel circuit of the primary winding 6a of the ignition coil 6 and the diode 5, the ground and the diode 11 thus charging the capacitor 4 as shown by the dot-and-dash line in (a) of FIG. 9.

When the output of the capacitor charging coils 1 and 2 reverses eventually, the voltage shown by the dot-and-dash line in (b) of FIG. 9 would be applied across the gate and cathode of the thyristor 8 by the output from the secondary winding 9b of the transformer 9 in the similar manner as at low engine speeds when the secondary winding 14b of the transformer 14 is open-circuited. However, as the engine speed increases, the secondary output of the transformer 14 increases as shown by the broken line in (c) of FIG. 9 and becomes sufficiently large to render the Zener diode 15 conductive, and thereby current begins to flow from the secondary winding 14b through a circuit comprising the secondary winding 14b of the transformer 14, the Zener diode 15, the diode 16, a parallel circuit of the gate and cathode of the thyristor 8 and the secondary winding 9b of the transformer 9 and to the ground. Consequently, the combined input applied across the gate and cathode of the thyristor 8 becomes higher as a result of a combination of the output of the transformer 9 and the output of the transformer 14 as shown by the broken line in (b) of FIG. 9, whereby the firing position of the thyristor 8 is advanced, namely, the ignition timing is advanced. Similarly as at low engine speeds, the conduction of the thyristor 8 causes an ignition spark at the spark plug 7. The resulting ignition timing characteristics will become as shown in FIG. 10.

In FIG. 10, the curve a is the ignition timing characteristic when the secondary winding 14b of the transformer 14 is open-circuited, the curves b, c, d and e show respectively the ignition timing characteristics when the Zener voltage of the Zener diode 15 is selected, 12, 6, 4 and 2 volts, respectively, and the curves f and g demonstrate the ignition timing characteristics when eliminating the Zener diode 15 and instead employing two units and single unit of the diode 16, respectively. As noted from FIG. 10, the spark advance can be freely selected depending on variations of the Zener diodes.

Figure 11:
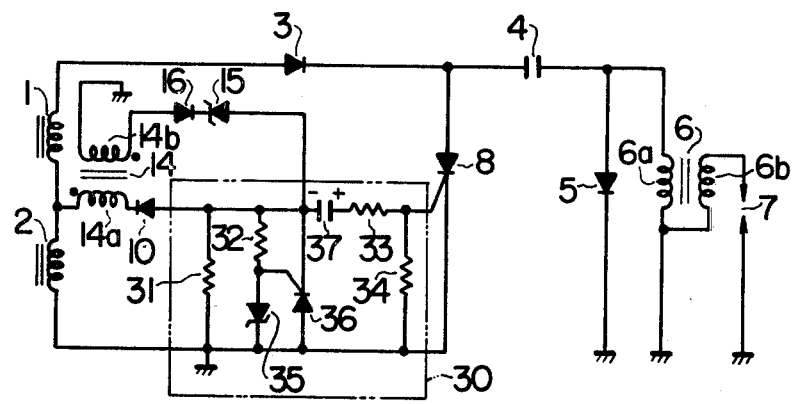
FIGS. 11, 12, 13 and 14 are circuit diagrams showing fifth, sixth, seventh and eighth embodiments of the system of this invention.

FIG. 11 illustrates a fifth embodiment of the invention wherein the transformer 9 is replaced with a signal conversion circuit 30 including resistors 31, 32, 33 and 34, a Zener diode 35, a thyristor 36 and a capacitor 37. In this fifth embodiment, when a negative going output is generated in the low-speed capacitor charging coil 2, current flows from the lowspeed capacitor charging coil 2 through a circuit comprising the low-speed capacitor charging coil 2, the resistor 34 and 33, the capacitor 37, the diode 10 and the primary winding 14a of the transformer 14 and thus the capacitor 37 is charged in the polarity shown. When the voltage across the capacitor 37 (which is applied across the Zener diode 35) becomes higher than a predetermined value, the Zener diode 35 is rendered conductive so that the thyristor 36 is turned on and the stored charge on the capacitor 37 is discharged through the capacitor 37, the resistor 33, the gate and cathode of the thyristor 8 and the thyristor 36 thus turning on the thyristor 8. As mentioned earlier, voltage is generated in the secondary winding 14b of the transformer 14 by the current flowing through the primary winding 14a during the charging of the capacitor 37. While the magnitude of this voltage is small at low engine speeds thus having no effect on the control of the thyristor 8, when the engine is operating at an intermediate speed, voltage generated in the secondary winding 14b of the transformer 14 becomes higher than the Zener voltage of the Zener diode 15 to render the Zener diode 15 conductive resulting in that positive voltage generated at the secondary winding 14b is applied to a junction point of the capacitor 37 and the cathode of the thyristor 36, and thereby the voltage across the terminals of the capacitor 37 is decreased by an amount corresponding to this applied positive voltage. When this occurs, the rate of charging the capacitor 37 is decreased so that the firing timing of the thyristor 8 at the intermediary engine speed is retarded.

Figure 12:
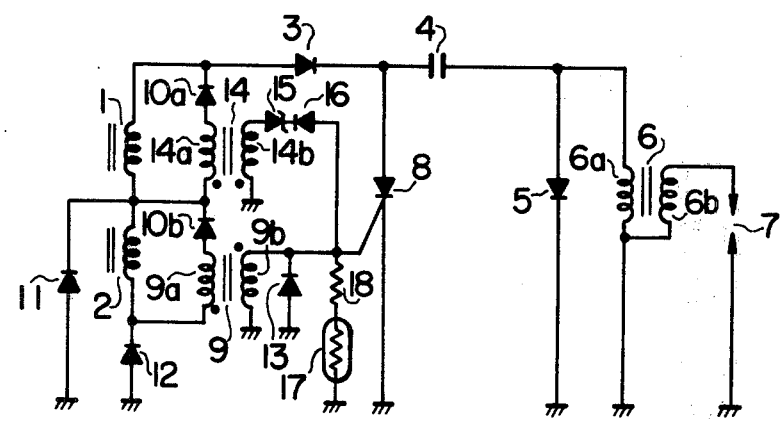

FIG. 12 illustrates a sixth embodiment of the invention wherein the negative going output of the low-speed capacitor charging coil 2 is used to produce an output in the secondary winding of the transformer 9 and the negative going output of the high-speed capacitor charging coil 1 is used to produce an output in the secondary winding of the transformer 14.

Figure 13:
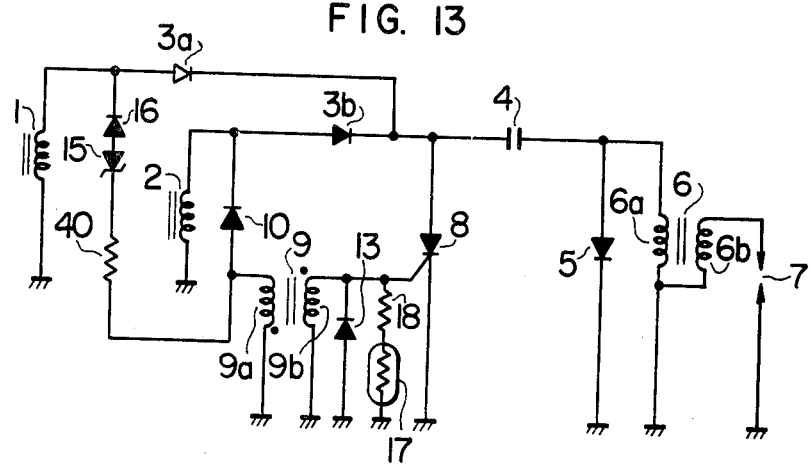

FIG. 13 illustrates a seventh embodiment of the invention wherein the capacitor charging coils 1 and 2 are respectively connected through diodes 3a and 3b to the capacitor 4. Each of the negative going half cycles of the outputs of the capacitor charging coils 1 and 2 is applied to the same primary winding 9a of the transformer 9 respectively through the Zener diode 10 and a circuit of the resistor 40, the Zener diode 15 and the diode 16. In this seventh embodiment, the capacitor 4 is charged through the diodes 3a and 3b with the positive going outputs of the capacitor charging coils 1 and 2. At low engine speeds only the negative going output of the low-speed capacitor charging coil 2 is applied to the transformer 9 to control the thyristor 8 because the Zener diode 15 is not made into conduction. At intermediate engine speeds the Zener diode 15 is rendered conductive to apply to the transformer 9 the both negative going outputs of the capacitor charging coils 1 and 2 resulting in control of the thyristor 8, and in this way the ignition timing is advanced.

Figure 14:
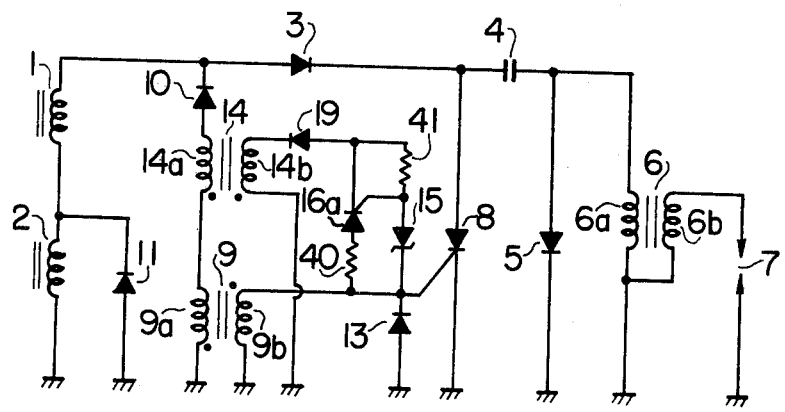
Figure 15:
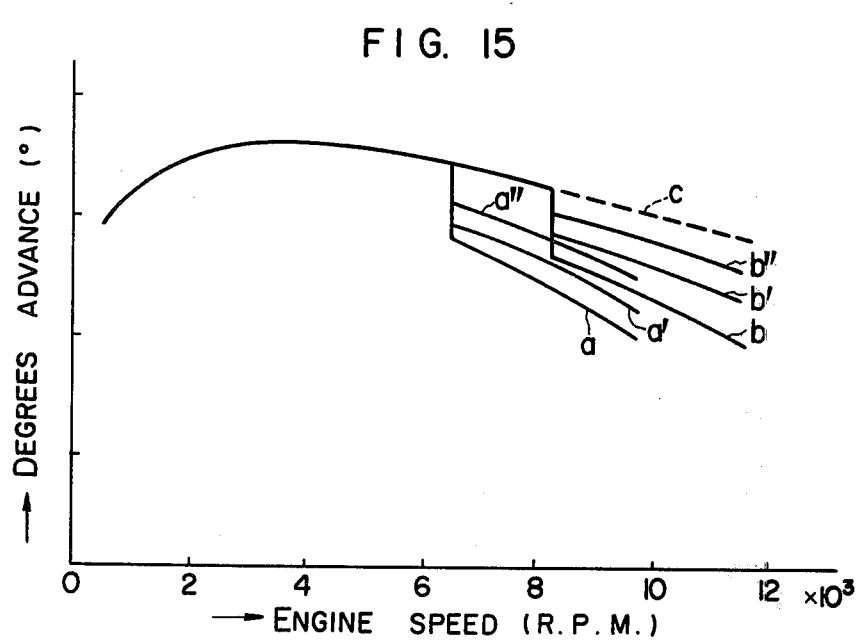
FIG. 15 is a waveform diagram useful for explaining the operation of the system shown in FIG. 14.

FIG. 14 illustrates an eighth embodiment of the invention wherein the transformer 14, the diodes 10 and 19, the Zener diode 15, a thyristor 16a and a resistor 41 constitutes a signal conversion circuit, whereby when the voltage generated in the secondary winding 14b of the transformer 14 exceeds a predetermined value for rendering the Zener diode 15 conductive, the thyristor 16a is turned on and the Zener diode 15 and the resistor 41 are short-circuited to thereby more rapidly retarding the ignition timing at high engine speeds. The ignition timing characteristics obtained by this embodiment are shown in FIG. 15, namely, assuming that the curves a and b are the ignition timing characteristics when the Zener voltage of the Zener diode 15 is selected 12 and 18 volts, respectively, and the resistor 40 is eliminated, the curves a', a", b' and b" are the ignition timing characteristics when the resistance value of the resistor 40 is selected 180 and 470 ohms, respectively. The broken line curve c is the ignition timing characteristic when the secondary winding of 14b of the transformer 14 is open-circuited.

Figure 16:
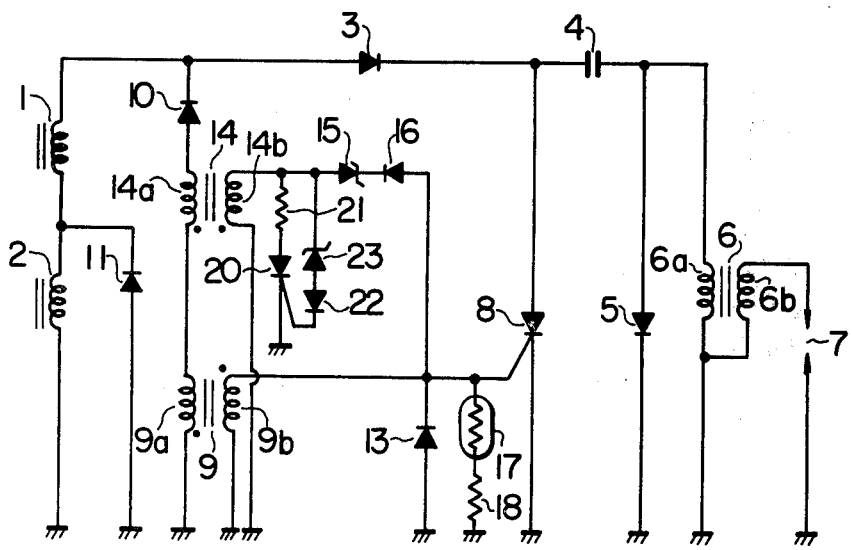
FIG. 16 is a circuit diagram showing a ninth embodiment of the system of the invention.

FIG. 16 illustrates a ninth embodiment of the invention which differs from the second embodiment of FIG. 4 in that a series circuit of a resistor 21 and a thyristor 20 is connected across the terminals of the secondary winding 14b of the transformer 14, a series circuit of a diode 22 and a Zener diode 23 is further connected between the gate of the thyristor 20 and the secondary winding 14b of the transformer 14 and the resistor 40 is eliminated.

With the construction described above, the system of this embodiment is one which employs a two-pole permanent magnet type alternator for generating one cycle of the AC output for every one revolution of the engine (i.e. the generator).

Figure 17:
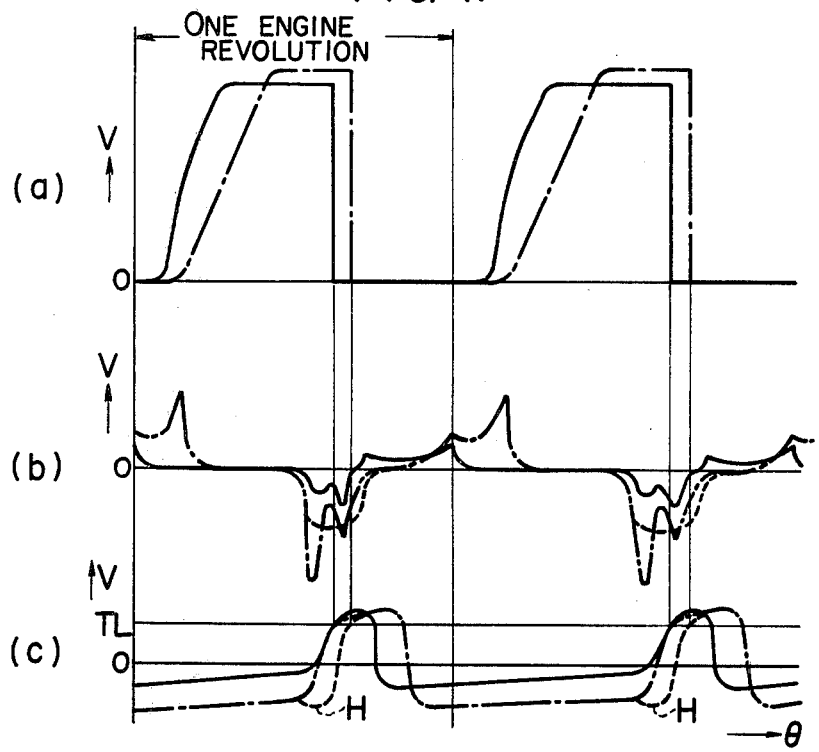
FIG. 17 is a waveform diagram useful for explaining the operation of the system shown in FIG. 16.

In operation, one cycle of the AC voltage is generated for every one revolution of the engine in the high-speed capacitor charging coil 1 having a relatively small number of winding turns and adapted for charging the capacitor 4 chiefly at high engine speeds and the low-speed capacitor charging coil 2 having a relatively large number of winding runs and adapted for charging the capacitor 4 chiefly at low engine speeds. With the engine operating at a low speed, when a positive going voltage starts to develop in the capacitor charging coils 1 and 2, current flows from the capacitor charging coils 1 and 2 through a circuit comprising the low-speed capacitor charging coil 2, the high-speed capacitor charging coil 1, the diode 3, the capacitor 4, a parallel circuit of the diode 5 and the primary winding 6a of the ignition coil 6 and to the ground, whereby the capacitor 4 is charged as shown by the solid line in (a) of FIG. 17. In FIG. 17, the abscissa represents the rotational angle θ of the magneto generator i.e. the engine. When the generated voltage in the capacitor charging coils 1 and 2 reverses its direction from the positive to the negative, the generated voltage in the low-speed capacitor charging coil 2 is short-circuited by the diode 11, while the generated output of the high-speed capacitor charging coil 1 is short-circuited through a circuit comprising the low-speed capacitor charging coil 2, the ground, the primary winding 9a of the transformer 9, the primary winding 14a of the transformer 14 and the diode 10 so that the output is generated at the secondary winding 9b of the transformer 9, which would be applied across the gate and cathode of the thyristor 8 as shown by the solid line in (c) of FIG. 17. At the low-speed running of the engine, the output from the secondary winding 14b of the transformer 14 is small as shown by the solid line in (b) of FIG. 17, and lower than the Zener voltage of the Zener diode 15, and therefore, it has no effect on the ignition position. When the gate voltage of the thyristor 8 eventually reaches the trigger level (TL) of the thyristor 8, the thyristor 8 is turned on and the stored charge on the capacitor 4 is discharged through a circuit comprising the capacitor 4, thyristor 8, the ground and the primary winding 6a of the ignition coil 6 thus generating a high voltage in the secondary winding 6b of the ignition coil 6 and causing an ignition spark at the spark plug 7. In this embodiment, the diode 5 serves to maintain the current flow through the primary winding 6a of the ignition coil 6 to elongate the arc duration of the ignition spark at the spark plug 7. When the running speed of the engine is increased, the charging of the capacitor 4 is accomplished chiefly by current flowing from the high-speed capacitor charging coil 1 by way of a circuit comprising the high-speed capacitor charging coil 1, the diode 3, the capacitor 4, a parallel circuit of the diode 5 and the primary winding 6a of the ignition coil 6, the ground and the diode 11, as shown by the dot-and-dash line in (a) of FIG. 17. When the output from the capacitor charging coils 1 and 2 reverses its direction, the no-load output of the transformer 14 becomes higher than the Zener voltage of the Zener diode 15 as shown by the dot-and-dash line in (b) of FIG. 17 and consequently the voltage shown by the broken line (which shows the voltage under the load) in (b) of FIG. 17 is applied across the gate and cathode of the thyristor 8 from the transformer 14. Thus, when the output from the capacitor charging coils 1 and 2 reverse its direction, while the voltage shown by the dot-and-dash line in (c) of FIG. 17 is applied across the gate and cathode of the thyristor 8 by the output of the secondary winding 9b of the transformer 9 when the secondary winding 14b of the transformer 14 is open-circuited (under no-load conditions), the rising portion of the applied voltage is cancelled as shown by the broken line H in (c) of FIG. 17 by the output of the transformer 14 generated as shown by the broken line in (b) of FIG. 17 when the secondary winding 14b is connected and in this way the ignition timing is retarded.

Figure 18:
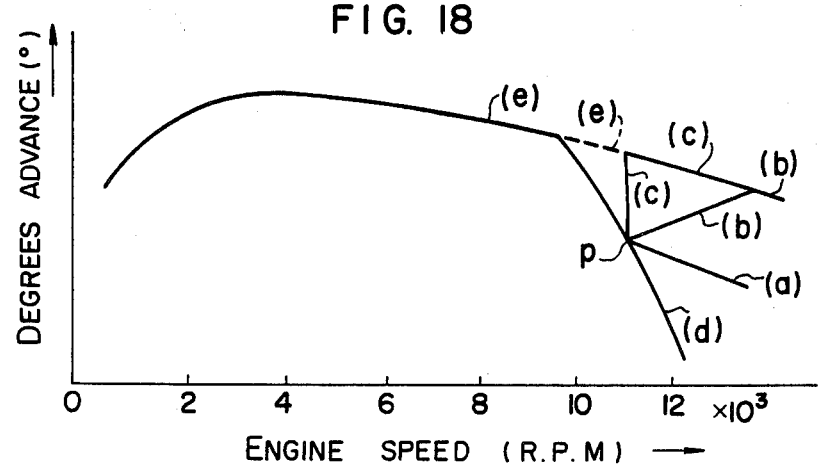
FIG. 18 is an ignition timing characteristic diagram of the system shown in FIG. 16.

When the engine speed increases further so that the service engine speed is exceeded, the Zener diode 23 is rendered conductive by the positive going voltage of the output from the secondary winding 14b of the transformer 14 shown in (b) of FIG. 17, resulting in that the thyristor 20 is turned on by the current flowing from the transformer 14 through a circuit comprising the Zener diode 23, the diode 22, the gate and cathode of the thyristor 20 and the ground and the output of the secondary winding 14b of the transformer 14 which is directed in one direction is short-circuited through a circuit comprising the resistor 21 and the thyristor 20. This short-circuiting retards the phase of the output from the transformer 14 and the output of the transformer 14 in the opposite direction is also affected thus delaying the phase of this oppositely directed output and also decreasing its magnitude. Consequently, the signal voltage shown by the dot-and-dash line in (c) of FIG. 17 is cancelled in a reduced degree by the output of the transformer 14 and the resulting ignition timing characteristic becomes as shown in FIG. 18 depending on the resistance value of the resistor 21. In FIG. 18, as for example, the curve (e) is the ignition timing characteristic when there is no rapid spark retard (when the transformer 14 is eliminated), the curve (d) is the rapid spark retard ignition timing characteristic when the transformer 14 is used, the curves (a), (b) and (c) are the ignition timing characteristics when the high-speed control means for cancelling rapid spark retard is used and the resistance value of the resistor 21 is selected high (100 ohms), medium (32 ohms) and zero, respectively. The operating position P (rpm) of the high-speed control means may be adjusted as desired depending on the Zener voltage of the Zener diode 23.

Figure 19:
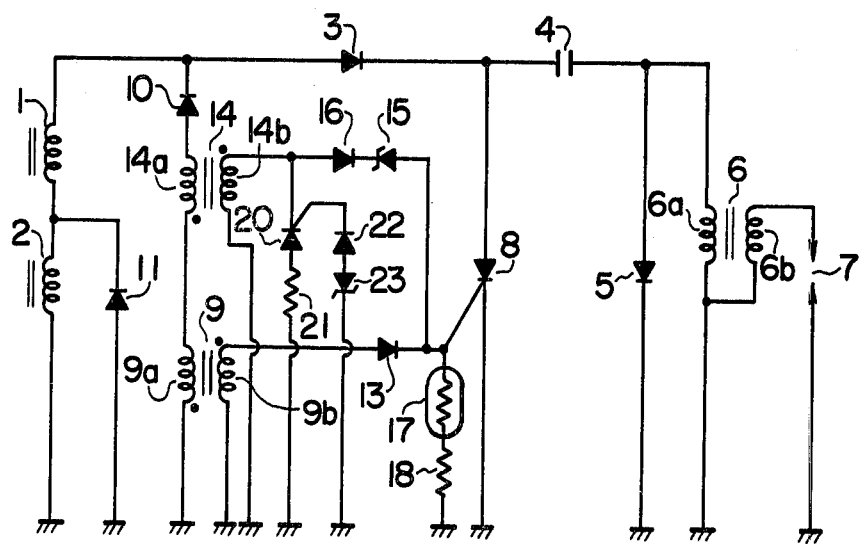
FIG. 19 is a circuit diagram showing a tenth embodiment of the system of the invention.
Figure 20:
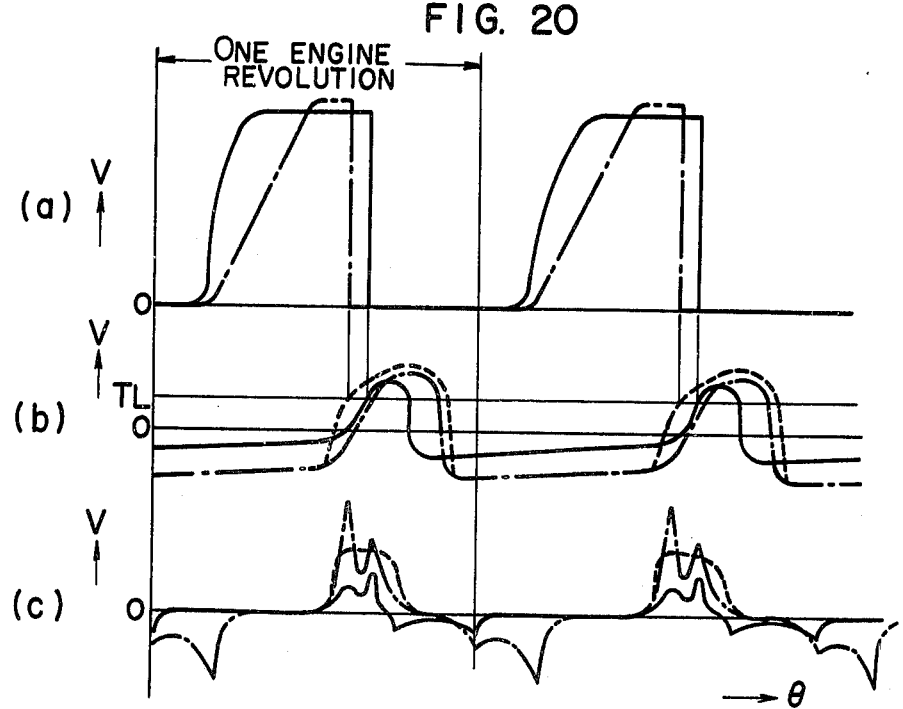
FIG. 20 is a waveform diagram useful for explaining the operation of the system shown in FIG. 19.

FIG. 19 illustrates a tenth embodiment of the invention which differs from the ninth embodiment of FIG. 16 in that the polarities of the secondary winding 14b of the transformer 14, the Zener diode 15 and the diode 16 are reversed and the cathode of the Zener diode 23 is connected to the ground. The tenth embodiment operates as follows. One cycle of the AC voltage is generated for every one revolution of the engine in the high-speed capacitor charging coil 1 having a relatively small number of winding turns and adapted for charging the capacitor 4 chiefly at high engine speeds and the low-speed capacitor charging coil 2 having a relatively large number of winding turns and adapted for charging the capacitor 4 chiefly at low engine speeds. When the engine is operating at a low speed, current flows from the capacitor charging coils 1 and 2 through a circuit comprising the low-speed capacitor charging coil 2, the high-speed capacitor charging coil 1, the diode 3, the capacitor 4, a parallel circuit of the diode 5 and the primary winding 6a of the ignition coil 6 and the ground and the capacitor 4 is charged as shown by the solid line in (a) of FIG. 20. When the generated voltage in each of the capacitor charging coils 1 and 2 reverses its direction from the positive to the negative, the output of the low-speed capacitor charging coil 2 is short-circuited by the diode 11. On the other hand, the output of the high-speed capacitor charging coil 1 is short-circuited through a circuit comprising the high-speed capacitor charging coil 1, the low-speed capacitor charging coil 2, the ground, the primary winding 9a of the transform 9, the primary winding 14a of the transform 14 and the diode 10 and the output shown by the solid line in (b) of FIG. 20 is generated in the secondary winding 9b of the transformer 9 and applied across the gate and cathode of the thyristor 8. When this applied voltage becomes higher than the trigger level (TL) of the thyristor 8, the thyristor 8 is turned on and the stored charge on the capacitor 4 is discharged through a circuit comprising the capacitor 4, the thyristor 8, the ground and the primary winding 6a of the ignition coil 6, thus generating a high voltage in the secondary winding 6b of the ignition coil 6 and causing an ignition spark at the spark plug 7. On the other hand, though the output shown by the solid line in (c) of FIG. 20 is generated simultaneously with the generation of the output in the secondary winding 9b of the transformer 9, the magnitude of this output is small at low engine speeds and consequently the Zener diode 15 is not rendered conductive and the output of the transformer 14 has no effect on the thyristor 8. The charging of the capacitor 4 at high engine speeds is accomplished chiefly by current flowing from the high-speed capacitor charging coil 1 through a circuit comprising the high-speed capacitor charging coil 1, the diode 3, the capacitor 4, a parallel circuit of the diode 5 and the primary winding 6a of the ignition coil 6, the ground and the diode 11 and the capacitor 4 is charged as shown by the dot-and-dash line in (a) of FIG. 20. When the output from the capacitor charging coils 1 and 2 reverses its direction, similarly at low engine speeds, the voltage applied across the gate and cathode of the thyristor 8 by the output of the secondary winding 9b of the transform 9 becomes as shown by the dot-and-dash line (b) of FIG. 20 when the secondary winding 14b of the transformer 14 is open-circuited, whereas the no-load secondary output of the transformer 14 becomes sufficiently high as shown in (c) of FIG. 20 by the dot-and-dash line (the secondary output at load is shown by the broken line) so that the Zener diode 15 is rendered conductive and a current flows from the secondary winding 14b through a circuit comprising the secondary winding 14b of the transformer 14, the diode 16, the Zener diode 15, the gate and cathode of the thyristor 8 and the ground. Consequently, the combined input applied across the gate and cathode of the thyristor 8 consists of the combination of the output of the transformer 9 and the output of the transformer 14 as shown by the broken line in (b) of FIG. 20 and the firing position of the thyristor 8 is advanced, namely, the ignition timing is advanced. And, similarly at low engine speeds, the thyristor 8 is turned on and an ignition spark is caused at the spark plug 7.

Figure 21:
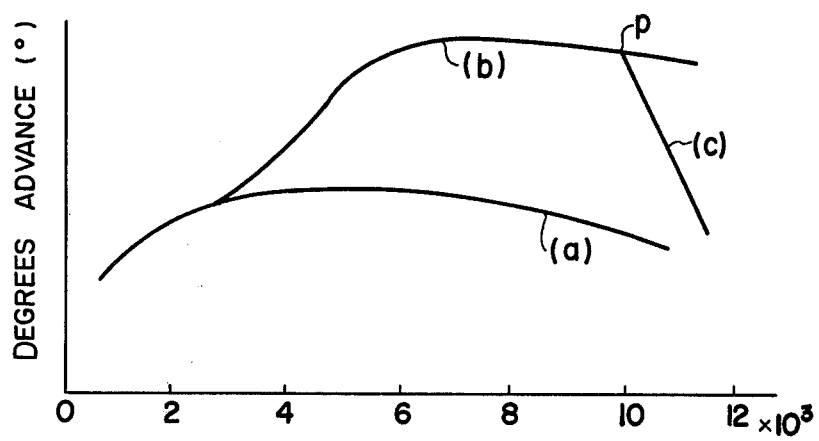
FIG. 21 is an ignition timing characteristic diagram of the system shown in FIG. 19.

When the engine speed increases further, the Zener diode 23 is rendered conductive in response to the negative going voltage in the secondary winding 14b of the transformer 14 so that the thyristor 20 is turned on by the current flowing from the secondary winding 14b of the transformer 14 through a circuit comprising the ground, the Zener diode 23, the diode 22 and the gate and cathode of the thyristor 20 and the negative going output from the secondary winding 14b of the transformer 14 is short-circuited through the resistor 21 and the thyristor 20. This short-circuiting retards the phase of the negative going output of the transformer 14 thus also delaying the phase of the positive going output of the transformer 14 and decreasing its magnitude. Consequently, the spark advancing signal voltage advanced in phase and shown by the broken line in (b) of FIG. 20 is reduced and the resulting timing ignition characteristic will become as shown in FIG. 21. In FIG. 21, as for example, the curve (a) is the ignition timing characteristic when the transformer 14 is eliminated, the curve (b) is the ignition timing characteristic when the transformer 14 is used and the curve (c) is the ignition timing characteristic when the cancelling high-speed control means is used. Further, the inflection point P may be adjusted as desired depending on the Zener voltage of the Zener diode 23.

While, in the ninth and tenth embodiments described above, only the single high-speed control means is used in one of the signal conversion circuits, it is of course possible to provide more complex ignition timing characteristics by providing such high-speed control means in each of the signal conversion circuits or by using two or more high-speed control means which are operable at different engine speeds.

Further, while, in the above-described ninth and tenth embodiments, of the output generated in the secondary winding 14b of the transformer 14 the negative going output which is not utilized for controlling the gating of the thyristor 8 is short-circuited through the resistor 21 and the thyristor 20 included in the high-speed control means, the positive going portion of the output from the secondary winding 14b of the transformer 14 which is not utilized for controlling the gating of the thyristor 8 may be short-circuited through the resistor 21 and the thyristor 20 included in the high-speed control means.

Still further, while in the above-described ninth and tenth embodiments, the Zener diode 23 in the high-speed control means detects the negative going portion of the output from the secondary winding 14b of the transformer 14 which is not utilized for controlling the gating of the thyristor 8, the positive going portion of the output from the secondary winding 14b of the transformer 14 which is utilized for controlling the gating of the thyristor 8 may be detected by the Zener diode 23 in the high-speed control means or alternately the positive or negative going output of the capacitor charging coils 1 and 2 may be detected by the Zener diode 23 in the high-speed control means.

Figure 22:
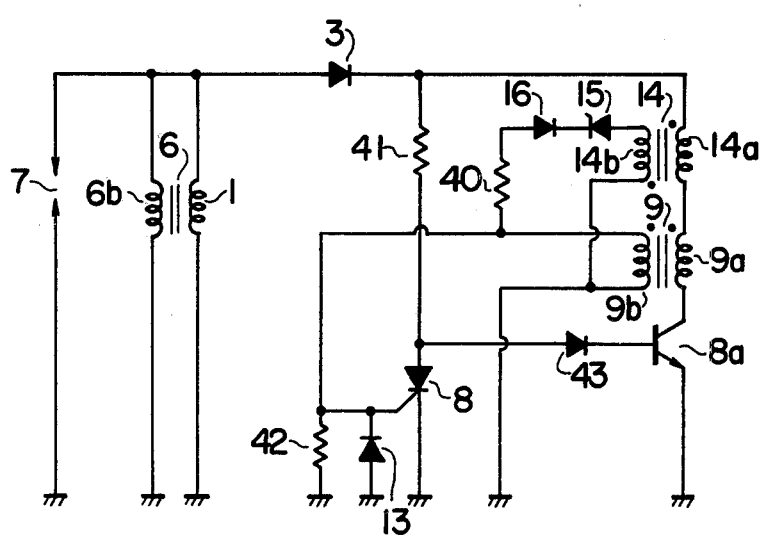
FIG. 22 is a circuit diagram showing an eleventh embodiment of the system of the invention.

FIG. 22 illustrates an eleventh embodiment of the invention wherein a generating coil 1 of a magneto generator is also utilized as the primary winding of an ignition coil 6, a series circuit including a diode 3, primary windings 14a and 9a of transformers 14 and 9 and a transistor 8a constituting a semiconductor switching element is connected across the terminals of the generating coil 1, the cathode of the diode 3 is connected to the ground through a resistor 41 and a thyristor 8, the anode of the thyristor 8 is connected to the base of the transistor 8a through a diode 43, a parallel circuit including a secondary winding 9b of the transformer 9, a resistor 42 and a diode 13 is connected between the gate and cathode of the thyristor 8, and a series circuit including a resistor 40, a diode 16, a Zener diode 15 and a secondary winding 14b of the transformer 14 is connected between the gate and cathode of the thyristor 8. With this eleventh embodiment, when a positive going voltage is generated in the generating coil 1, a base current flows to the transistor 8a from the generating coil 1 through a circuit comprising the generating coil 1, the diode 3, the resistor 41, the diode 43, the base and emitter of the transistor 8a and the ground and the transistor 8a is turned on. This causes the flow of current from the generating coil 1 through a circuit comprising the diode 3, the primary winding 14a of the transformer 14, the primary winding 9a of the transformer 9, the collector and emitter of the transistor 8a and the ground. The output then generated in the secondary winding 9b of the transformer 9 is applied between the gate and cathode of the thyristor 8 so that when this applied voltage exceeds the trigger level of the thyristor 8, the thyristor 8 is turned on and the base and emitter section of the transistor 8a is short-circuited. When this occurs, the transistor 8a is turned off and the current flowing in the generating coil 1 is rapidly interrupted thus generating a high voltage in the secondary winding 6b of the ignition coil 6 whose primary winding is comprised of the generating coil 1 and causing an ignition spark at the spark plug. In this case, although an output is also generated in the secondary winding 14b of the transformer 14 which is inserted in the closed circuit of the generating coil 1, the output voltage generated in the secondary winding 14b at low engine speeds is small and the Zener diode 15 is not rendered conductive. As a result, the thyristor 8 is controlled only by the output generated in the secondary winding 9b of the transformer 9 and consequently the ignition timing characteristic is gradually advanced in accordance with the engine speed or rpm. When the engine speed exceeds a predetermined value so that the output generated in the secondary winding 14b of the transformer 14 becomes higher than the Zener voltage of the Zener diode 15, the Zener diode 15 is rendered conductive and the generated output in the secondary winding 14b of the transformer 14 is applied in the direction opposite to the secondary winding 9b of the transformer 9 to cancel the generated output in the secondary winding 9b. Consequently, the firing timing of the thyristor 8 is retarded and the ignition timing characteristic is gradually retarded in accordance with the engine speed.

While, in the embodiments illustrated in FIGS. 4, 8, 14, 16, 19 and 22, the primary windings 9a and 14a of the transformers 9 and 14 are connected in series with each other, these primary windings 9a and 14a may be connected in parallel with each other through a diode or without using a diode.

Further, while, in the embodiments illustrated in FIGS. 1, 4, 8, 12, 13, 14, 16, 19 and 22, the diode 13 is provided between the gate and cathode of the thyristor 8 in inverse parallel connection therewith, the diode 13 may be eliminated if a diode is inserted in series with the gate circuit of the thyristor 8 or if the gate and cathode of the thyristor 8 can withstand a considerably high reverse voltage.

Still further, while, in the embodiments of the invention described above, the Zener diode 15 is mainly utilized to vary the impedance of one signal conversion circuit relative to that of the other signal conversion circuit, any other semiconductor element such as a diac or varistor may be used in place of the Zener diode 15 or alternately other element such as a coil, capacitor or resistor may be used to vary the impedance of the signal conversion circuit.

What is claimed is:

1. A contactless ignition system for an internal combustion engine comprising:
   capacitor charging coils connected to a magneto generator driven by an internal combustion engine for generating alternating current in synchronism with rotation of said internal combustion engine, said alternating current having positive and negative half waves;
   a capacitor connected in series with said capacitor charging coils for storing said positive half waves;
   an ignition coil having a primary winding connected in series with said capacitor and a secondary winding;
   a spark plug connected to said secondary winding and mounted in said internal combustion engine;
   a switching element having a control gate and connected to said capacitor, said switching element, said capacitor and said primary winding forming a capacitor discharging circuit;
   a timing signal generating circuit having an input terminal and an output terminal;
   said input terminal being connected to said capacitor charging coils so that said negative half wave is supplied to said timing signal generating circuit to generate a timing signal at said output terminal for each of said negative half waves;
   said output terminal being connected to said control gate of said switching element, whereby when said timing signal is supplied thereto the stored charge of said positive half waves on said capacitor is discharged through said capacitor discharging circuit to produce an ignition spark at said spark plug; and
   a timing signal control circuit including a transformer having a primary coil and a secondary coil, said primary coil being connected to said capacitor charging coils to produce at said secondary coil an output signal in a period overlapping that of said timing signal in proportion to said alternating current, said secondary coil being connected to said timing signal generating circuit through a Zener diode to supply said output signal at said secondary coil thereto while said timing signal is supplied to control gate of said switching element, so that said timing signal is modulated by the output signal of said timing signal control circuit to smoothly vary the output of said timing signal generator when said output signal exceeds a predetermined value which depends on the Zener voltage of said Zener diode, whereby the ignition timing of said ignition spark is appropriately controlled by the modulated timing signal of said timing signal generating circuit.

2. A contactless ignition system as set forth in claim 1, wherein said capacitor charging coils include;
- a low speed capacitor charging coil having a large number of winding turns for generating alternating current mainly when said internal combustion engine runs at a low speed; and
- a high-speed capacitor charging coil having a small number of winding turns for generating alternating current mainly when said internal combustion engine runs at a high speed.

3. A contactless ignition system as set forth in claim 2, wherein said timing signal generating circuit comprises;
- a timing transformer having a first timing winding and a second timing winding; and
- a diode connected in series with said first timing winding, said diode and said first timing winding being connected across said low-speed capacitor charging coil to allow said negative half wave to flow therethrough; said second timing winding being connected to said control gate of said switching element and also to said timing signal control circuit.

4. A contactless ignition system as set forth in claim 3, wherein said primary coil of said timing signal control circuit is connected in series with said capacitor charging coils so as to produce said output at said secondary coil when said positive half wave flows through said primary coil.

5. A contactless ignition system as set forth in claim 2, wherein said timing signal generating circuit includes a transformer having a first timing winding and a second timing winding, said first timing winding being connected across said high-speed capacitor charging coil through a diode and said primary coil of said timing signal control circuit, to thereby allow said negative half wave to flow therethrough, said second timing winding being connected to said control gate of said switching element and also to said secondary coil of said timing signal control circuit through said Zener diode.

6. A contactless ignition system as set forth in claim 5, wherein said Zener diode is connected at its anode to said secondary coil of said timing signal control circuit and at its cathode to said second timing winding of said timing signal generating circuit.

7. A contactless ignition system as set forth in claim 5, wherein said Zener diode is connected at its cathode to said secondary coil of said timing signal control circuit and at its anode to said second timing winding of said timing signal generating circuit.

8. A contactless ignition system as set forth in claim 6, wherein said timing signal control circuit further includes a thyristor having a gate connected to a juncture between the anode of said Zener diode and said secondary coil of said timing signal control circuit, the anode-cathode path of said thyristor being connected across the cathode and the anode of said Zener diode.

9. A contactless ignition system as set forth in claim 8, wherein the anode of said thyristor is connected to the cathode of said Zener diode through a resistor.

10. A contactless ignition system as set forth in claim 6, wherein said timing signal control circuit further comprises;
- a thyristor having a gate, the anode-cathode path thereof being connected across said secondary coil of said timing signal control circuit; and
- a further Zener diode connected at its cathode to a juncture between the anode of said Zener diode and the secondary coil and at its anode to said gate of said thyristor.

11. A contactless ignition system as set forth in claim 7, wherein said timing signal control circuit further comprises;
- a thyristor having a gate, the anode-cathode path thereof being connected across said secondary coil of said timing signal control circuit; and
- a further Zener diode connected at its anode to said gate of said thyristor and at its cathode to the anode of said thyristor.

12. A contactless ignition system as set forth in claim 2, wherein said timing signal generating circuit includes a diode connected at its cathode to said capacitor charging coils, the cathode thereof being also connected to said control gate of said switching element, and said primary coil of said timing signal control circuit being connected in series with said capacitor charging coils so as to produce said output at said secondary coil when said positive half wave flows through said primary coil.

13. A contactless ignition system as set froth in claim 2, wherein said timing signal generating circuit includes;
- a series circuit of a resistor and a capacitor connected across said low-speed capacitor charging coil;
- a thyristor having a gate and connected across said series circuit; and
- a Zener diode connected across said series circuit, the anode thereof being connected to said gate of said thyristor.

14. A contactless ignition system as set forth in claim 13, wherein said primary coil of said timing signal control circuit is connected in series with said series circuit, and said Zener diode is connected at its cathode to said secondary coil and at its anode to said capacitor of said series circuit.

15. A contactless ignition system as set forth in claim 3, wherein said primary coil of said timing signal control circuit is connected across said high-speed charging coil through a diode so as to allow said negative half wave to flow therethrough.

16. A contactless ignition system for an internal combustion engine comprising:
- low-speed and high-speed capacitor charging coils connected to a magneto generator driven by an internal combustion engine for respectively generating alternating current in synchronism with rotation of said internal combustion engine, said alternating current having positive and negative half waves;
- a capacitor respectively connected to said low-speed and high-speed capacitor charging coils for storing said positive half waves;
- an ignition coil having a primary winding connected in series with said capacitor and a secondary winding;
- a spark plug connected to said secondary winding and mounted in said internal combustion engine;
- a switching element having a control gate and connected to said capacitor, said switching element, said capacitor and said primary winding forming a capacitor discharging circuit;
- a transformer having a primary coil and a secondary coil, said primary coil being connected across said low-speed capacitor charging coil through a diode to allow said negative half wave at said low-speed capacitor charging coil to flow therethrough, to thereby produce a timing signal at said secondary coil, said secondary coil being connected to said control gate of said switching element, whereby when said timing signal is supplied thereto the stored charge of said positive half waves on said capacitor is discharged through said capacitor discharging circuit to produce an ignition spark at said spark plug; and a Zener diode connected at its cathode to a juncture between said primary coil and said diode and at its anode to a juncture between said high-speed capacitor charging coil and said capacitor in order to allow said negative half wave generated at said high-speed capacitor charging coil to flow through said primary coil when said negative half wave generated at said high-speed capacitor charging coil exceeds a predetermined value which depends on the Zener voltage of said Zener diode and while said timing signal is supplied to said control gate of said switching element, whereby said timing signal is modulated by said negative half wave generated at said high-speed capacitor charging coil so that the ignition timing of said ignition spark can be advanced by the modulated timing signal.

17. A contactless ignition system for an internal combustion engine comprising:

a generating coil mounted in a magneto generator driven by an internal combustion engine for generating alternating current in synchronism with rotation of said internal combustion engine;

a secondary coil mounted in said magneto generator and magnetically coupled to said generating coil, whereby high voltage is induced thereat when rapid change of said current is carried at said generating coil;

a spark plug connected to said secondary coil and mounted in said internal combustion engine;

a switching element having a control gate and connected across said generating coil;

a timing signal generating transformer having a primary winding and a secondary winding connected to said control gate for generating a timing signal when the positive half wave of said alternating current flows through said primary winding;

a switching transistor having a base connected to said generating coil, the collector-emitter path thereof being connected to said generating coil through said primary winding;

a timing signal control transformer having a first winding and a second winding, said first winding being connected in series with said collector-emitter path and said generating coil; and a Zener diode connected at its anode to said second winding of said timing signal control transformer and at its cathode to a juncture between said control gate of said switching element and said secondary winding of said timing signal generating circuit, whereby when an output at said second winding exceeds a predetermined value, said Zener diode becomes conductive to supply said output to said control gate while said timing signal is supplied to said control gate of said switching element, so that said timing signal is modulated by said output to control the ignition timing.

18. A contactless ignition system for an internal combustion engine comprising:

a capacitor charging coil mounted in a magneto generator driven by an internal combustion engine for generating alternating current in synchronism with rotation of said internal combustion engine, said alternating current having positive half waves and negative half waves;

a diode connected at its anode to one terminal of said capacitor charging coil;

a capacitor connected at one end to the cathode of said diode;

an ignition coil having a primary winding and a secondary winding, one end of said primary winding being connected to the other end of said capacitor and the other end of said primary winding being connected to the other terminal of said capacitor charging coil;

a spark plug connected across said secondary winding and mounted in said internal combustion engine;

a switching thyristor having a control gate, the anode thereof being connected to said one end of said capacitor and the cathode thereof being connected to said other end of said primary winding;

a first transformer having a primary coil and a secondary coil, one end of said primary coil being connected to said one terminal of said capacitor charging coil and the other end of said primary coil being connected to said other terminal of said capacitor charging coil so as to allow said negative half wave to flow therethrough, one end of said secondary coil being connected to said control gate of said switching thyristor and the other end of said secondary coil being connected to said cathode of said switching thyristor, whereby a timing signal is generated at said secondary coil when said negative half wave flows through said primary coil so that stored charge on said capacitor is discharged through the anode-cathode path of said switching thyristor and said primary winding of said ignition coil to produce an ignition spark at said spark plug;

a second transformer having a primary coil and a secondary coil, one end of said primary coil of said second transformer being connected to said one terminal of said capacitor charging coil and the other end of said primary coil of said second transformer being connected to said other terminal of said capacitor charging coil, one end of said secondary coil of said second transformer being connected to said cathode of said switching thyristor, said second transformer generating at its secondary coil an output signal in a period overlapping that of said timing signal; and a Zener diode, one end thereof being connected to the other end of said secondary coil of said second transformer and the other end of said Zener diode being connected to said control gate of said switching thyristor, whereby said output signal at said secondary coil of said second transformer is supplied to said control gate of said switching thyristor when said output signal exceeds a predetermined value to make said Zener diode into conduction and while said timing signal is generated at said secondary coil of said first transformer, so that said timing signal is modulated by said output to control the ignition timing of said ignition spark.

19. A contactless ignition system for an internal combustion engine comprising:
- a spark plug mounted in an internal combustion engine for producng an ignition spark;
- an ignition coil having a primary winding and a secondary winding connected to said spark plug for supplying a secondary high voltage to said spark plug;
- a generating coil adapted to be mounted in a magneto generator driven by said engine for generating an alternating current in synchronism with the rotation of said magneto generator, said alternating current having positive and negative half waves;
- a charging circuit including a rectifier and a capacitor connected in series with each other, said charging circuit being connected to charge said capacitor by said positive half wave;
- a discharging circuit connected to said capacitor and including a switching element having a control gate and said primary winding of said ignition coil for discharging the charge on said capacitor therethrough when said switching element becomes conductive to thereby produce the secondary high voltage at said secondary winding of said ignition coil;
- a signal generator, connected to said control gate of said switching element, for generating an ignition signal in synchronism with the rotation of said engine, whereby when said ignition signal is supplied to said control gate said switching element is triggered to become conductive thus enabling the discharge of the charge on said capacitor;
- a Zener diode; and
- a transformer having a primary winding and a secondary winding, said primary winding being connected to said generating coil to permit one of said half waves to flow therethrough to thereby produce an output at said secondary winding in response to the half wave permitted to flow through said primary winding, said secondary winding being connected to said signal generator through said Zener diode for supplying said output to said signal generator when said output exceeds a predetermined value which depends on the Zener voltage of said Zener diode and while said ignition signal is supplied to said control gate of said switching element, whereby said timing signal is modulated by said output to vary smoothly said output of said output generator to thereby effect a change of said ignition signal at said signal generator.

20. A contactless ignition system for an internal combustion engine comprising:
- means mounted in a magneto generator driven by an internal combustion engine for generating an ignition energy in synchronism with rotation of said internal combustion engine;
- means for generating high voltage in response to a rapid change of said ignition energy;
- means for generating an ignition spark at a spark plug mounted in said internal combustion engine;
- means for carrying said rapid change of said ignition energy upon receiving a timing signal;
- means for generating said timing signal in synchronism with said rotation of said internal combustion engine;
- a transformer having a primary winding and a secondary winding, said primary winding being connected to said ignition energy generating means so as to produce an output at said secondary winding in response to said ignition energy; and
- a Zener diode, connected between said secondary winding and said timing signal generating means, for supplying said output to said timing signal generating means when said output exceeds a Zener voltage of said Zener diode and while said timing signal is generated at said timing signal generating means, whereby said timing signal is modulated by said output to smoothly vary, thus effecting a change of said timing signal.

* * * * *